United States Patent [19]

Henry

[11] Patent Number: 4,782,245

[45] Date of Patent: Nov. 1, 1988

[54] CONNECTING AND SWITCHING APPARATUS WITH SELECTABLE CONNECTIONS

[75] Inventor: Mark B. Henry, Medford, N.J.

[73] Assignee: Northern Telecom Limited, Montreal, Canada

[21] Appl. No.: 95,915

[22] Filed: Sep. 14, 1987

[51] Int. Cl.⁴ .......................................... H01H 36/00
[52] U.S. Cl. ................................ 307/147; 307/49; 307/112; 379/325; 379/327; 335/206
[58] Field of Search .............. 307/112, 113, 114, 147, 307/148, 149, 150, 151, 115, 39, 34; 361/346-415; 379/325, 327; 335/206, 207; 340/825.89; 370/58

[56] References Cited

U.S. PATENT DOCUMENTS

| | | | |
|---|---|---|---|
| 3,842,219 | 10/1974 | Anderson | 379/325 |
| 3,963,301 | 6/1976 | Stark | 361/413 |
| 4,037,186 | 7/1977 | Palmer et al. | 335/206 |
| 4,112,401 | 9/1978 | Palmer et al. | 335/206 |
| 4,140,918 | 2/1979 | Lancaster | 307/112 |
| 4,326,107 | 4/1982 | Perna | 379/325 |
| 4,675,900 | 6/1987 | Temkin | 379/327 |
| 4,701,630 | 10/1987 | Annunziata et al. | 307/112 |
| 4,704,599 | 11/1987 | Kimmel et al. | 307/49 X |

OTHER PUBLICATIONS

Radio Shack, 1985 catalog, pp. 120–121.

*Primary Examiner*—William M. Shoop, Jr.
*Assistant Examiner*—Paul Ip
*Attorney, Agent, or Firm*—Thomas R. Morrison

[57] ABSTRACT

A connecting and switching module employs a common type of connector for use with a plurality of types of interconnected systems by providing an adapter having a plug mateable with a common type of connector at one end, and a connector adapted to the system at the other end. In one embodiment of the invention, mechanical interference between adjacent connectors is avoided by providing alternating long and short adapters. Wiring on the circuit board of the module may be the same, with adaptation for different systems taking place in the adapter. This permits a single board design for all systems, with possible minor modification of a monitoring electronic circuit.

5 Claims, 7 Drawing Sheets

Fig. 3

CONNECTING AND SWITCHING APPARATUS WITH SELECTABLE CONNECTIONS

BACKGROUND OF THE INVENTION

The present invention relates to apparatus for patching multiple electrical lines to permit changing connections to equipment.

U.S. Pat. No. 4,037,186, together with the references cited therein, disclose connecting and switching modules for switching multiple lines between electrical equipment. In one specific application discussed therein, multiple-line connection between a local equipment and a modem may be broken and alternative connections may be established by inserting plugs at the ends of patch cords into sockets in the front of each connecting and switching module. Switching to accomplish the breaking and connecting is performed by a plurality of magnetic reed switches actuated by a magnet moved into its actuating position by the act of inserting the plugs.

As noted in the references, a plurality of connecting and switching modules are conventionally mounted side by side in, for example, a standard rack. This permits patch-cord interconnection between equipment connected to any pair of connecting modules. In this manner, operation of a modem or other equipment may be monitored, faults may be isolated and substitute modems or test equipment may be connected as desired to maintain operation of a system.

I have discovered that the prior art frequently employs a different type of connecting and switching modules for each application. Each different type conventionally represents a completely different design from all others. That is, the circuit board required to satisfy each communications protocol is unique. Thus, a manufacturer supplying a broad line of connecting and switching devices must bear the cost of designing, manufacturing and stocking an extensive line of connecting and switching devices. The number of unique designs may exceed ten or twenty.

In analyzing the differences between the conventional designs, I have discovered that they include different monitoring electronic circuits and different connectors for making the connections to modems and local equipment. The remaining functions of the conventional designs are common.

it is desirable to have as much flexibility at the rack level as possible. In the prior art, most rack-mounted patching systems employ 16 connecting and switching modules side by side in a standard 19-inch rack. One popular type of connector used in a V.35 communications system is so larg that installing 16 modules in a standard rack is prevented by interference between the hoods of connector plugs inserted into the connectors on the modules. It has become conventional to employ a smaller number of connecting and switching modules in a V.35 system. Instead of the 16 modules standard in most other systems, a V.35 system usually can accommodate only 12 modules to avoid connector crowding.

The differences between module mounting in a V.35 system from that in, for example, an RS 232C or an X.21 system present operational drawbacks, besides the cost of the unique design. For example, it is not possible to mix and match V.35 modules in a rack containing other types of modules. The extra space required for V.35 modules precludes this. Thus, even if only one or two V.35 modules are required, a user must provide a full rack of 12 modules to satisfy the need.

OBJECTS AND SUMMARY OF THE INVENTION

It is an object of the invention to provide a connecting and switching apparatus which overcomes the drawbacks of the prior art.

It is a further object of the invention to provide a connecting and switching apparatus permitting design of a single circuit board with modified electronic circuits for customization to different applications.

It is a further object of the invention to provide a connecting and switching apparatus having a single type of connector for all applications with a plug-in adapter to accommodate realigning signals from the single type of connector to connectors required by other applications.

Briefly stated, the present invention provides a connecting and switching module permitting employment of a common type of connector with a plurality of types of interconnected systems. An adapter, having a plug mateable with the common type of connector at one end, includes a connector adapted to the system at the other end. In one embodiment of the invention, mechanical interference between adjacent connectors is avoided by providing alternating long and short adapters. Wiring on the circuit board of the module may be the same, with adaptation for different systems taking place in the adapter. This permits a single board design for all systems, with possible minor modification of a monitoring electronic circuit.

According to an embodiment of the invention, there is provided a connecting and switching module comprising: a circuit board, at least first and second connectors at a first end of the circuit board, switching means on the circuit board for switching lines between the first and second connectors, a plurality of patching receptacles on the circuit board for patching signals from at least one of the first and second connectors to external equipment, the circuit board being usable with at least first and second different systems, the at least first and second different systems including first and second plugs, respectively, at least one of the first and second plugs being incompatible with the first and second connectors, first and second adapters fittable onto the first and second connectors, respectively, the first and second adapters including means for permitting the at least one of the first and second plugs to connect to the adapter, wiring inside the adapter, and the wiring including means for connecting terminals of the first and second connectors to terminals of one of the first and second plugs in a pattern satisfying requirements of the at least one of the first and second plugs without requiring changes in the circuit board.

According to a feature of the invention, there is provided a plurality of connecting and switching modules installable side by side in a rack to form an array, comprising: each connecting and switching module including a circuit board, at least first and second connectors at a first end of the circuit board, the first connector on each circuit board being adjacent a first connector on its neighboring circuit board, switching means on the circuit board for switching lines between the first and second connectors, a plurality of patching receptacles on the circuit board for patching signals from at least one of the first and second connectors to external equipment, the circuit board being usable with at least first and second different systems, the at least first and second different systems including first and second plugs, respectively, at least one of the first and second plugs being incompatible with the first and second connectors, first and second adapters fittable onto the first and second connectors, respectively, on each of the plurality of circuit boards, the first and second adapters including means for permitting the at least one of the first and second plugs to connect thereto, wiring inside the first and second adapters, the wiring including means for connecting terminals of the first and second connectors to terminals of one of the first and second plugs in a pattern satisfying requirements of the at least one of the first and second plugs without requiring changes in the circuit board, and the first adapter on a circuit board having a length greater than a length of the second adapter on the same circuit board, whereby mechanical interference between the first and second plugs installed on the first and second adapters on the same circuit board is avoided.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
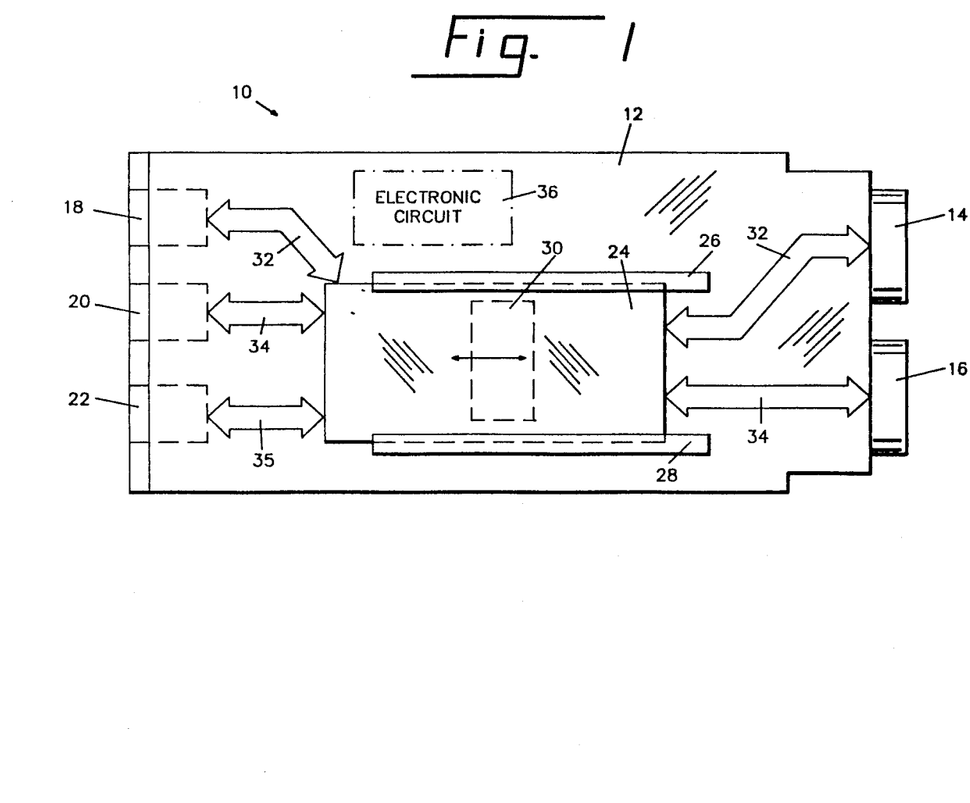
FIG. 1 is a simplified view of a connecting and switching module according to an embodiment of the invention.

Referring to FIG. 1, there is shown, generally at 10, a connecting and switching module of a type fully disclosed in the above-referenced patent. A circuit board 12 includes first and second connectors 14 and 16 at one end thereof and first, second and third receptacles 18, 20 and 22 at a second end thereof. A switching slide 24 is disposed for longitudinal motion in a pair of parallel guides 26 and 28 mounted on circuit board 12.

As disclosed in the referenced patent, a plurality of magnetic reed switches (not shown) on circuit board 12 are influenced by a permanent magnet 30 affixed to move with switching slide 24. A multiple-conductor trace 32 is connected from connector 14 to the magnetic reed switches hidden by switching slide 24. Similarly, a multiple-conductor trace 34 is connected from connector 16 to the magnetic reed switches. Multiple-conductor traces 32 and 34 may include any convenient number of conductors such as, for example, 24. Insertion of a connector of a patch cord into receptacle 18 or 20 makes contact with suitable ones of conductors in multiple-conductor traces 32 or 34, respectively, and automatically urges switching slide 24 into a position wherein permanent magnet 30 is effective for reversing contacts of the magnetic reed switches. A monitor multi-conductor trace 35, connected line for line to multiple-conductor trace 34 is connected to receptacle 22.

Since the structure and function of the above elements of connecting and switching module 10 are fully disclosed in the referenced patent, further discussion thereof is omitted from the present application.

An electronic circuit 36 is disposed on circuit board 12 conventionally for driving indicator lamps (not shown) in response to signals on multiple-conductor trace 34. The elements contained in electronic circuit 36 may differ in relatively minor ways between different communications protocols. For example, signal lines in RS 232C systems are generally single-ended, whereas V.35 and X.21 systems are double-ended. Thus, input resistor connections, and possibly signal voltage levels, may differ between different systems, but a major portion of electronic circuit 36 is common to all. Thus, a single basic design of circuit board 12, with minor modifications for input resistors and signal levels in electronic circuit 36 is capable of satisfying substantially all requirements. In this way, longer, more efficient runs of a basic design for circuit board 12 may be made. Then, minor customization creates the different designs.

Figure 2:
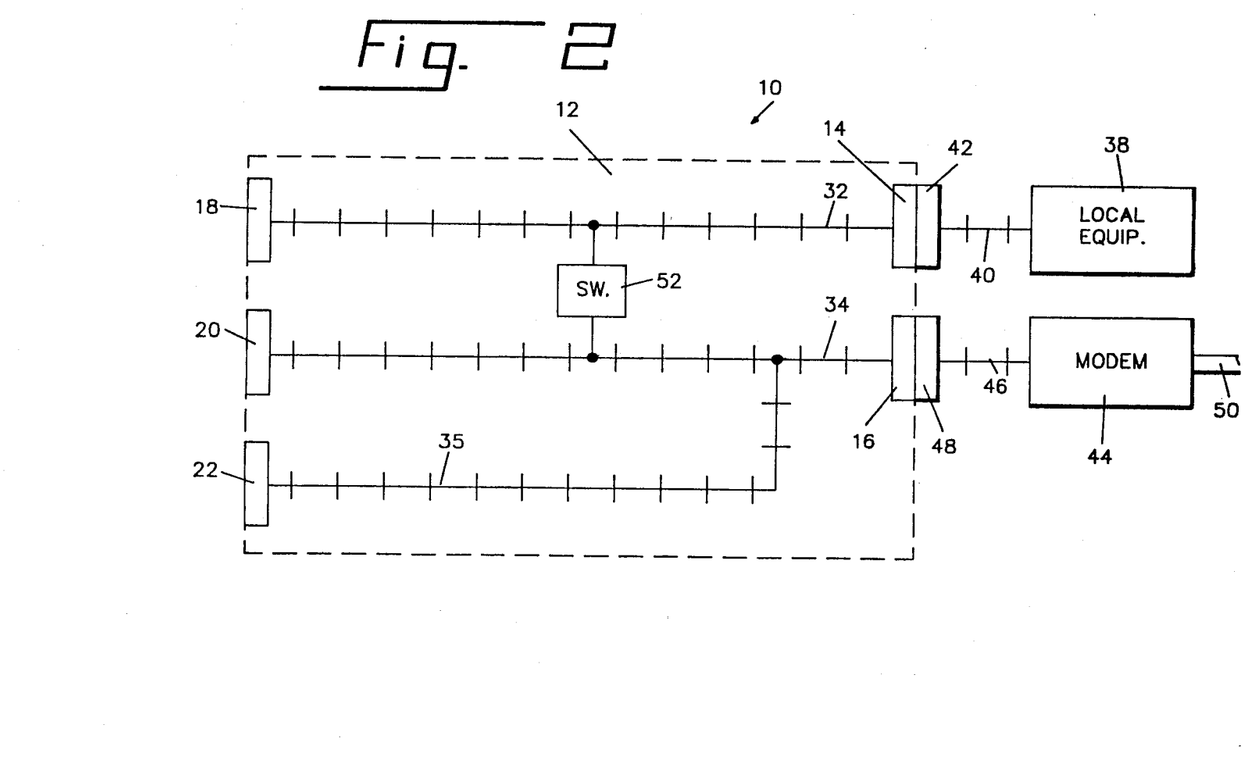
FIG. 2 is a simplified schematic diagram of the connecting and switching module of FIG. 1 connected to external equipment.

Referring now to FIG. 2, a schematic diagram of a typical connecting and switching module 10 includes multiple-conductor trace 32 connected directly between connector 14 and receptacle 18 and multiple-conductor trace 34 connected directly between connector 16 and receptacle 20. Monitor multi-conductor trace 35 branches off multiple-conductor trace 34 for connection of signals thereon to receptacle 22. A local equipment 38 which may be, for example, a computer or computer peripheral, is connected by a multi-conductor cable 40 to a connector 42 mated with connector 14. Similarly, a modem 44, or other equipment, is connected by a multi-conductor cable 46 to a connector 48 mated with connector 16. Modem 44 is connected to other equipment (not shown) by a cable 50. An array of magnetic reed switches 52 is connected conductor for conductor between multiple-conductor trace 32 and multiple-conductor trace 34.

In operation, in the absence of a connector of a patch cord (not shown) inserted into either or both of receptacles 18 and 20, contacts of array of magnetic reed switches 52 provide connection between multiple-conductor trace 32 and multiple-conductor trace 34, whereby signals at connector 14 mirror those at connector 16. Thus, local equipment 38 is connected to modem 44. Insertion of a connector of a patch cord into either receptacle 18 or receptacle 20 moves permanent magnet 30 (FIG. 1) into a position opening contacts of array of magnetic reed switches 52, whereby multiple-conductor traces 32 and 34 are disconnected. At the same time, suitable electrical connections are made with the patch cable, whereby a substitute local equipment or modem may be connected for troubleshooting or reassignment of resources.

Figure 3:
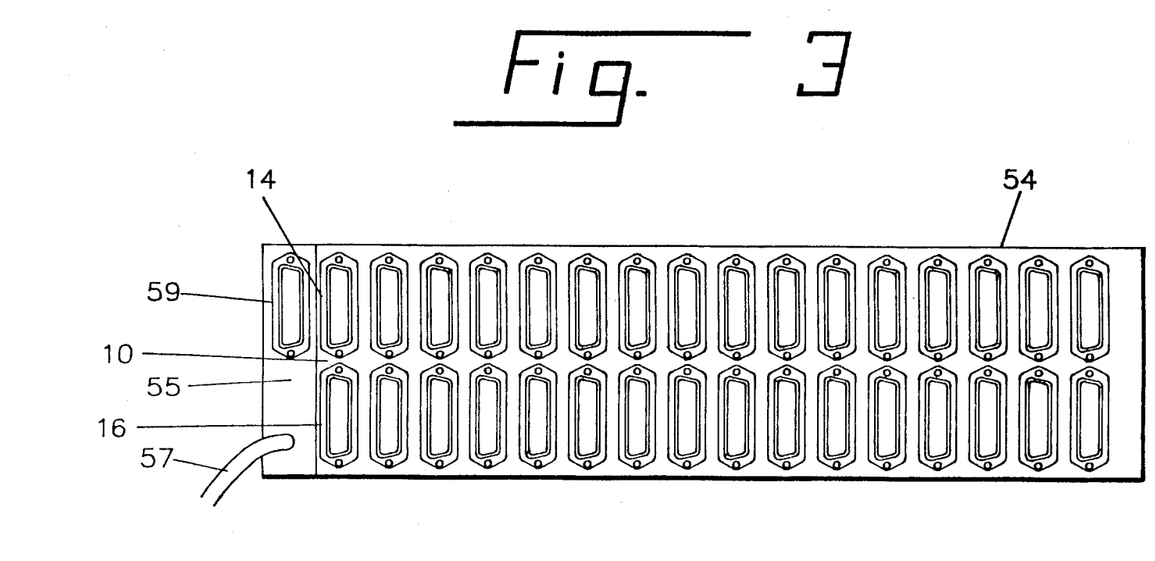
FIG. 3 is a rear view of a rack containing sixteen connecting and switching modules employing DB-25 connectors.

Referring now to FIG. 3, there is shown a rear view of a rack 54 containing sixteen connecting and switching modules 10 and a power and monitoring module 55. Each connecting and switching module 10 includes its connectors 14 and 16 disposed in an array. The illustrated connectors are, for example, type DB-25 connectors commonly used in RS 232C systems. A DB-25 connector includes provision for as many as 25 conductors. In practice, considerably fewer than 25 conductors are actually used. It will be noted that a substantial space exists around each of connectors 14 and 16 to permit attachment of a connector to it.

Power and monitoring module 55 conventionally includes a power cord 57 as well as a further connector 59 such as, for example, a DB-25 connector. In addition, the front of power and monitoring module 55 includes patch receptacles (not shown) corresponding to those previously described. Inserting a patch cord into cavities of power monitoring module 55 and one of connecting and switching modules 10' permits monitoring signal activity by viewing the conditions of light-emitting diodes (not shown) on the front of power and monitoring module 55.

Figure 4:
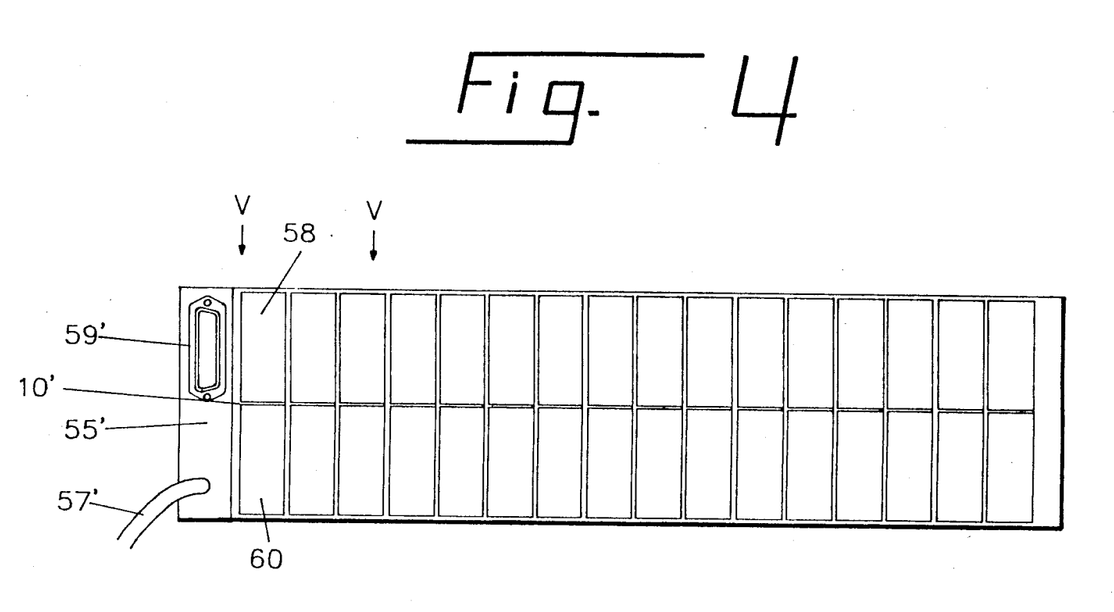
FIG. 4 is a rear view of a rack containing sixteen connecting and switching modules employing 34-pin connectors.

Referring now to FIG. 4, a rear view of a rack 56 is shown including sixteen connecting and switching modules 10' and a power and monitoring module 55'. Power and switching module 55' is identical to a corresponding element previously described.

Each connecting and switching module 10' includes first and second connectors 58 and 60 of a type commonly employed in a V.35 system,. Such a connector includes provision for as many as 34 conductors. In practice, less than 25 conductors are actually used. It will be noted that very little space exists horizontally between each connector 58 or connector 60 and its neighbor, nor vertically between each connector 58 and its neighboring connector 60. As will be detailed below, the close spacing conventionally precludes mounting sixteen connecting and switching modules 10' in a single rack. This constraint leads to the conventional provision of a 12-module rack especially for V.35 modules, rather than the 16-module rack used with most other systems.

Figure 5:
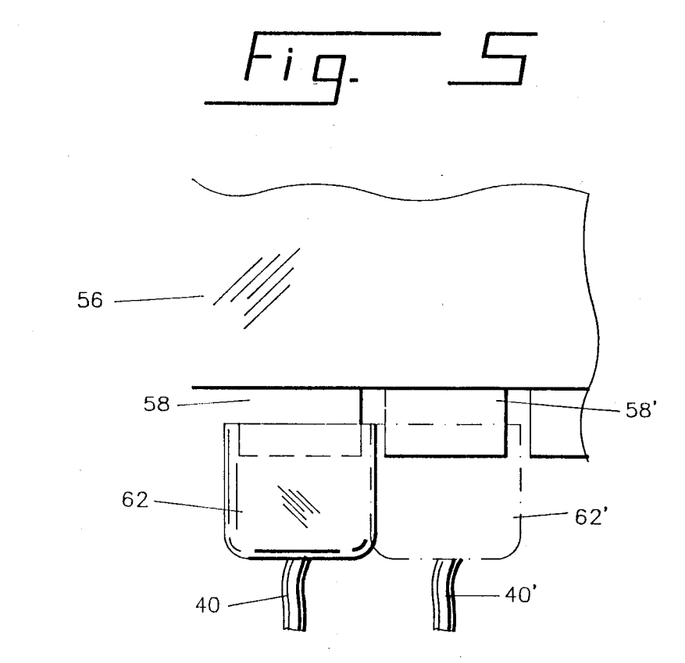
FIG. 5 is a view of the rack of FIG. 4 taken along V—V in FIG. 4.

The problem is clearly illustrated in FIG. 5 wherein horizontally adjacent connectors 58 and 58' are illustrated. A plug 62 is mated to connector 58 for connection to multi-conductor cable 40. Using conventional devices, plug 62 extends more than half way into the space between connectors 58 and 58'. The volume required for attachment of plug 62', shown in dashed line, to connector 58' is not available due to encroachment by plug 62. Although not illustrated, the same interference is experienced in the vertical direction between, for example, plug 62 on connector 58 and a corresponding plug for mating with connector 60 (FIG. 4) directly below connector 58.

Figure 6:
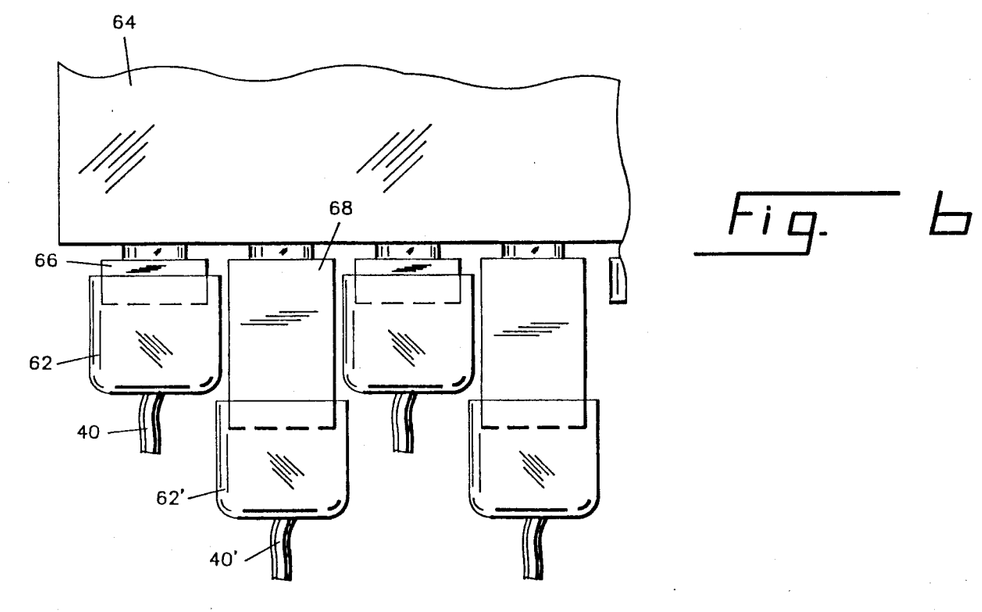
FIG. 6 is a view corresponding to that in FIG. 5 including long-short adapters for accommodating wide 34-pin plugs.

Referring now to FIG. 6, a rack 64 is shown having short adapters 66 at every other location along a top row. A long adapter 68 is disposed between each pair of short adapters 66. The difference in length between short adapters 66 and long adapters 68 permits installation of adjacent plugs 62 and 62' without mutual interference therebetween. Besides alternating between long and short in the horizontal direction shown, each short adapter 66 in the top row should be adjacent a long adapter 68 in the bottom row and vice versa.

Figure 7:
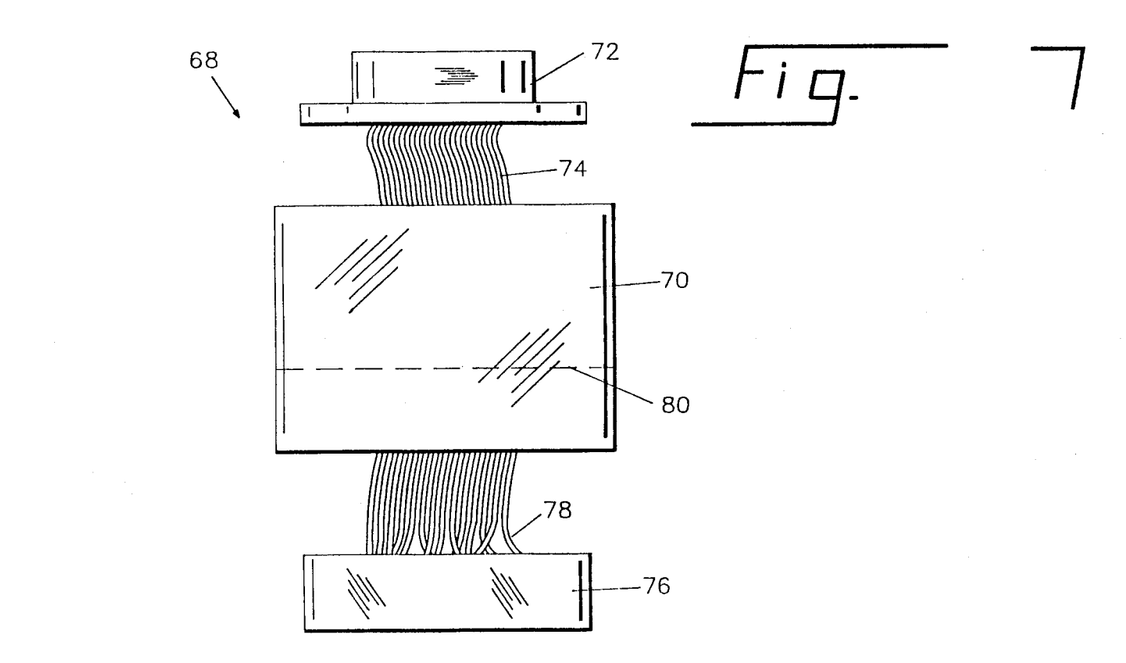
FIG. 7 is an exploded view of an adapter of FIG. 6.

Referring now to FIG. 7, long adapter 68 includes a shell 70. A 25-pin connector 72 is connected by a cable 74 passing through the interior of shell 70 to a 34-pin connector 76. When fully assembled, 25-pin connector 72 and 34-pin connector 76 are affixed to ends of shell 70, using any convenient means, to form a unitary assembly. It will be noted that individual conductors 78 are routed as desired to produce the correct interconnections between pins in 25-pin connector 72 and those in 34-pin connector 76. The only difference between long adapter 68 and short adapter 66 is found in the length of shell 70. The length of shell 70 required to produce short adapter 66 is illustrated by a dashed line 80.

Besides the RS 232C and large 34-pin connectors, other types of connectors are in common use. For example, fifteen-pin DB-15 connectors are frequently found as a standard in some systems. The present invention is perfectly adaptable to this type of connector using an adapter corresponding to that shown in FIG. 7, wherein 34-pin connector 76 is replaced by the DB-15 connector and the connection pattern of conductors 78 are made to accommodate the wiring convention for the connector used. The same 25-pin connector 72 is used in such a device, thus avoiding the requirement for different connectors 14 and 16 on circuit board 12 (FIG. 1). Since all wiring adaptation is made in cable 74, identical signal connections can be made on circuit board 12, regardless the ultimate system with which the module is used. A DB-15 connector, being small, does not require long-short positioning of mating connectors. Thus, a single adapter may be employed, if desired.

Accordingly, the present invention permits each connecting and switching module 10 to be manufactured with identical wiring and connectors 14 and 16. Adaptation to a particular system requires only minor modification of electronic circuit 36 and appropriate selection of long adapters. If standard DB-25 connectors are selected for connectors 14 and 16, whenever the system employs DB-25 connectors, connection can be made without an adapter. For other systems, an appropriate connector is required.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What I claim is:

1. An array of connecting and switching modules, comprising:
    at least one connecting and switching module;
    at least first and second connectors on said at least one connecting and switching module;
    said at least first and second connectors defining a plane;
    said at least first and second connectors including a spacing therebetween;
    said at least first and second connectors being mateable with first and second plugs, respectively;
    said first and second plugs including a lateral dimension such that, when said first plug is mated with said first connector, it intrudes into a space required for mating said second plug with said second connector, whereby simultaneous mating of said first and second plugs with said first and second connectors is prevented;
    at least one adapter;
    said at least one adapter including first means at a first end thereof for mating with said first connector;
    said at least one adapter including second means at a second end thereof for mating with said first plug;
    said at least one adapter including a length; and
    said length being effective for displacing said first plug with respect to said second plug a sufficient distance to avoid interference between said first and second plugs, whereby simultaneous connection of said first and second plugs with said first and second connectors is enabled.

2. An array according to claim 1 wherein:

said at least one adapter includes at least first and second adapters;

said first means and said second means being disposed on first and second ends of said first adapter;

said second adapter including third means on a first end thereof for mating with said second connector;

said second adapter including fourth means on a second end thereof for mating with said second plug; and said second adapter having a second length;

said length and said second length having a difference; and said difference being effective for displacing said first plug with respect to said second plug a sufficient distance to avoid interference between said first and second plugs, whereby simultaneous connection of said first and second plugs is enabled.

3. An array according to claim 1, wherein:

said at least one connecting and switching module includes at least first and second connecting and switching modules;

said first connector being disposed on said first connecting and switching module;

said second connector being disposed on said second connecting and switching module; and said first and second connectors being adjacent each other.

4. An array according to claim 3, wherein:

said at least first and second connectors includes third and fourth connectors;

said third connector being disposed on said first connecting and switching module;

said fourth connector being disposed on said second connecting and switching module;

said third and fourth connectors being adjacent each other;

said first and third connectors being spaced apart a second distance;

said second and fourth connectors being spaced apart said second distance;

said distance being such that, when said first connector is mated with said first connector, it intrudes into a space required for mating of a third plug on said third connector, whereby simultaneous mating of said first and third plugs with said first and second connectors is prevented;

said first adapter being mated with said first connector; and said length being effective for displacing said first plug with respect to said second and third plugs a sufficient distance to avoid interference between said first plug and said second plug and between said first plug and said third plug, whereby simultaneous connection of said first, second and third plugs is enabled.

5. An array according to claim 1, wherein said at first and second means include different numbers of pins, and said at least one adapter includes wires therein connecting between pins said first and second means.

* * * * *